United States Patent
Darley

(10) Patent No.: US 10,711,787 B1
(45) Date of Patent: Jul. 14, 2020

(54) PUMPING FACILITIES AND CONTROL SYSTEMS

(71) Applicant: W. S. Darley & Co., Itasca, IL (US)

(72) Inventor: Kyle M. Darley, Chippewa Falls, WI (US)

(73) Assignee: W.S. Darley & Co., Itasca, IL (US)

( * ) Notice: Subject to any disclaimer, the term of this patent is extended or adjusted under 35 U.S.C. 154(b) by 642 days.

(21) Appl. No.: 14/693,662

(22) Filed: Apr. 22, 2015

Related U.S. Application Data

(60) Provisional application No. 62/003,364, filed on May 27, 2014.

(51) Int. Cl.
| F04D 15/00 | (2006.01) |
| F04D 13/02 | (2006.01) |
| F04D 29/42 | (2006.01) |
| F04D 29/22 | (2006.01) |
| G01S 19/14 | (2010.01) |
| F04D 15/02 | (2006.01) |

(52) U.S. Cl.
CPC ......... *F04D 15/0066* (2013.01); *F04D 13/02* (2013.01); *F04D 15/0088* (2013.01); *F04D 15/0209* (2013.01); *F04D 29/22* (2013.01); *F04D 29/4293* (2013.01); *G01S 19/14* (2013.01)

(58) Field of Classification Search
CPC .... F04D 15/0066; F04D 29/669; F04D 13/14; F04D 15/029; F04D 15/0209; F04D 15/0245; F04D 15/0072; F04D 13/12; F04B 23/02; F04B 23/06
See application file for complete search history.

(56) References Cited

U.S. PATENT DOCUMENTS

| 5,213,477 A * | 5/1993 | Watanabe | F04B 49/065 417/20 |
| 5,536,147 A * | 7/1996 | Lang | F04D 9/041 417/199.2 |
| 6,663,349 B1 * | 12/2003 | Discenzo | F04D 15/0245 417/300 |
| 2003/0214398 A1* | 11/2003 | te Boekhorst | G08B 25/10 340/531 |
| 2006/0207659 A1* | 9/2006 | Shaefer | E03B 5/00 137/355.2 |
| 2007/0056630 A1* | 3/2007 | Moskun | F04D 15/0209 137/87.01 |
| 2008/0288115 A1* | 11/2008 | Rusnak | F04D 15/0066 700/282 |
| 2013/0108473 A1* | 5/2013 | Tamminen | F04B 49/00 417/3 |

* cited by examiner

Primary Examiner — Kenneth J Hansen
(74) Attorney, Agent, or Firm — Anthony J. Bourget

(57) ABSTRACT

A portable pump facility, pump facilities systems, and system to monitor and control a centrifugal pump include a controller configured to receive pressure and speed data from a centrifugal pump and automatically adjust the speed of an engine which drives the pump to control cavitation of the pump and to also optimize load balancing of fluid among pumping facilities. Multiple pumping facilities are provided and communicate for efficient fluid delivery, and include remote control monitoring and operation.

21 Claims, 8 Drawing Sheets

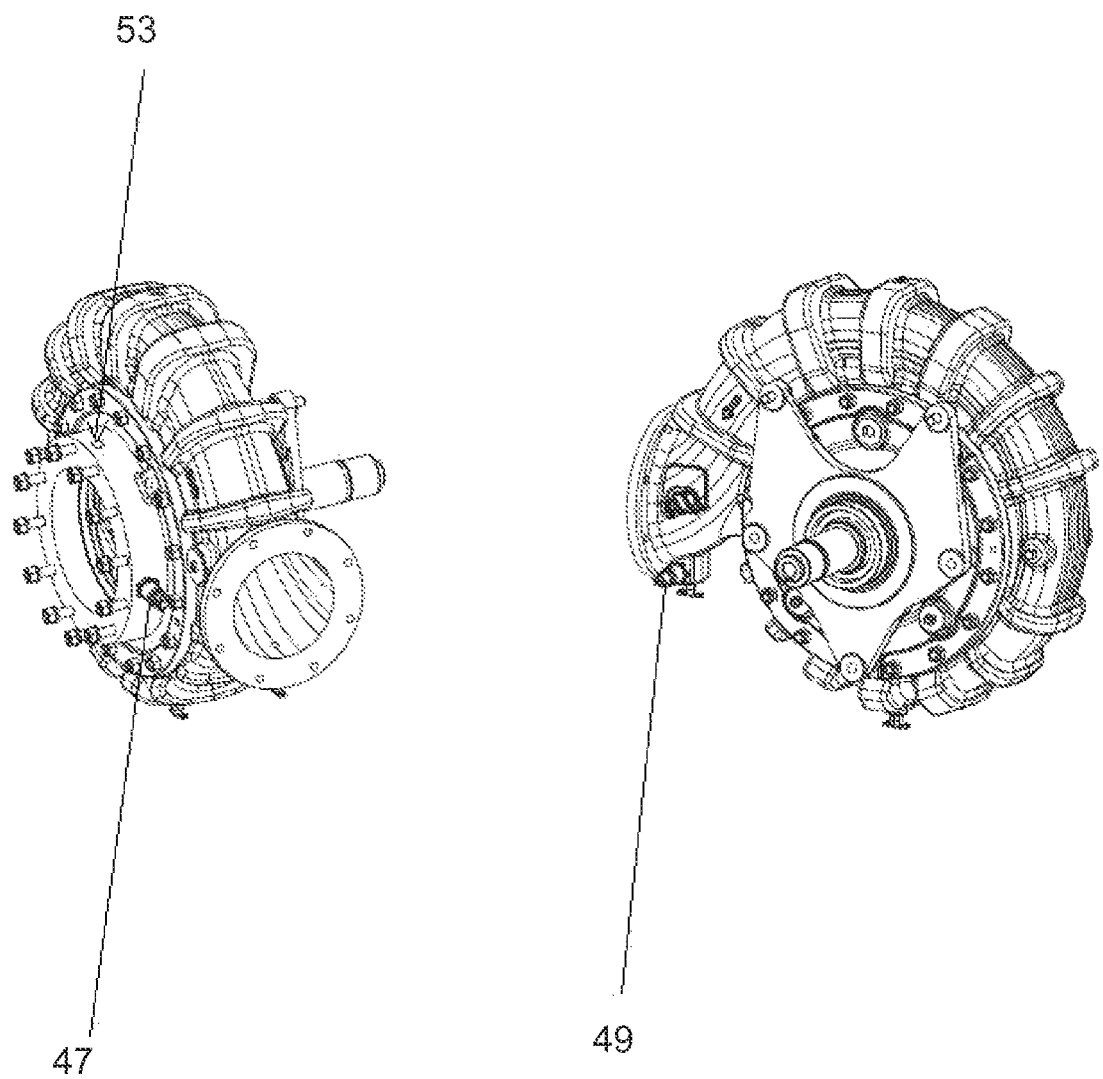

PUMPING FACILITIES AND CONTROL SYSTEMS

CROSS-REFERENCE TO RELATED APPLICATIONS

This application claims the benefit and priority of Provisional Patent Application Ser. No. 62/003,364 filed May 27, 2014, for SYSTEM FOR REMOTE MONITORING AND CONTROL OF PUMPING FACILITIES under 35 U.S.C. § 119(e), incorporated herein by reference in its entirety for continuity of disclosure.

BACKGROUND OF THE INVENTION

1. Field of the Invention

The present invention relates to systems and pumps used for displacing liquids, and more particularly to pumps and systems that may be remotely monitored and controlled, and automatically adjusted to reduce costs and operate efficiently.

2. Background Information

Pumping systems that use a series of pumps to deliver liquids over a span of territory or from location-to-location are known. Pipelines for instance include pumping stations which operate to maintain a continuous flow of liquid through the pipeline or conduit. There are several challenges associated with providing an efficient delivery of liquid through these systems.

SUMMARY OF THE INVENTION

The present invention pertains to pumping facilities and systems which automatically adjust the speed of a pumping facility to optimize fuel costs and also automatically adjust pumping facilities to provide efficient operation. In one aspect the system is configured to automatically optimize the flow characteristics and output of the facilities of the entire system, for instance by automatically controlling the speed of an engine which powers a centrifugal pump of a facility. In one aspect the facility includes a controller configured to adjust the speed of an engine in response to an increase of fluid pressure at an intake conduit of the facility, such that the speed may be reduced to save fuel while continuing to provide a pre-set pressure output of fluid from the facility. In one aspect a user may adjust (i.e., increase the output pressure setting) a setting associated with a discharge of a first pumping facility which in turn increases the pressure of fluid at a downstream facility such that a controller automatically adjusts the downstream facility to run at a slower speed (saving fuel costs) while continuing to maintain a pre-set discharge fluid pressure. Multiple supply lines of pump facilities may be used to supply a particular holding tank application, and the speeds and pressures of respective pump facilities and supply lines may be automatically balanced/controlled for efficiency.

In a further aspect a controller of a pump facility may also automatically adjust the speed of an engine which powers a pump of the facility in order to prevent or minimize a cavitation occurrence of the pump. The controller may automatically increase the speed of the engine and resulting pressure to a level less than a pre-set pressure of the pump which may be experiencing cavitation, and monitor the pressure data to determine if such automatic adjustment reduces the cavitation. The automatic adjustments may continue repeatedly until the pump is able to maintain a set output pressure without cavitation or may result in shut down of the facility.

The above partial summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 8 is a perspective view of a pump component in accordance with an aspect of the present invention.

FIG. 9 is a reverse perspective view of the component of FIG. 8.

Figure 1:
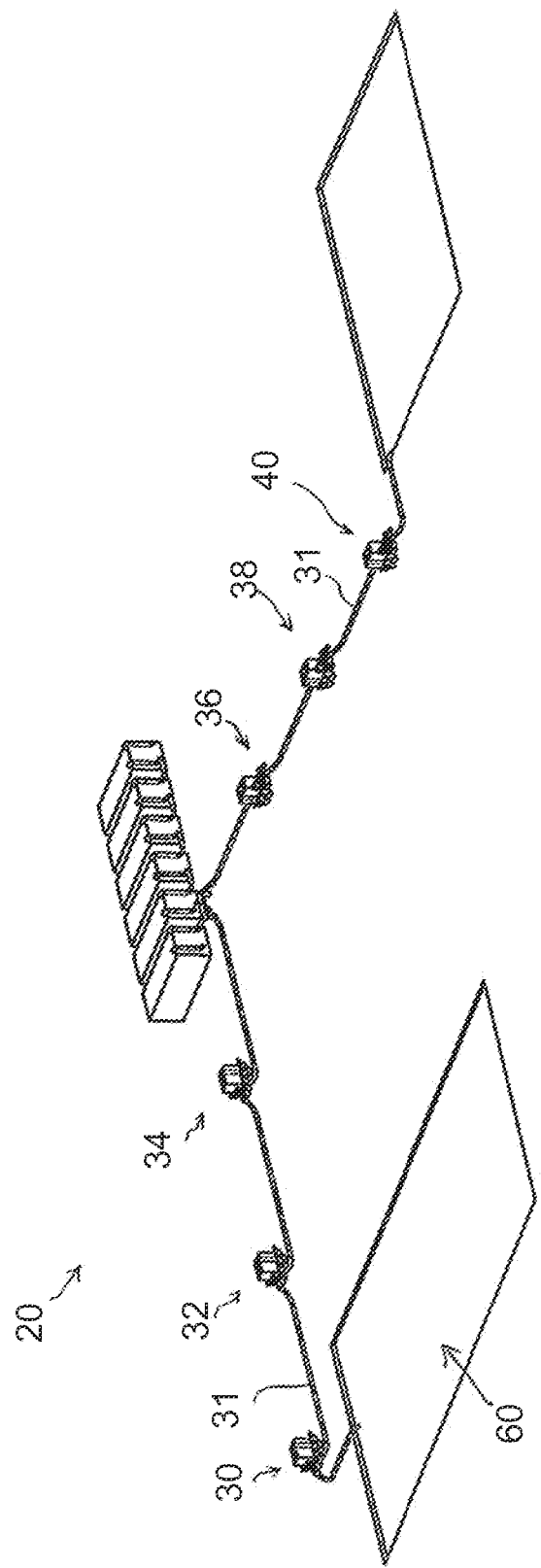
FIG. 1 is a perspective view of a system in accordance with one aspect of the present invention.
Figure 2:
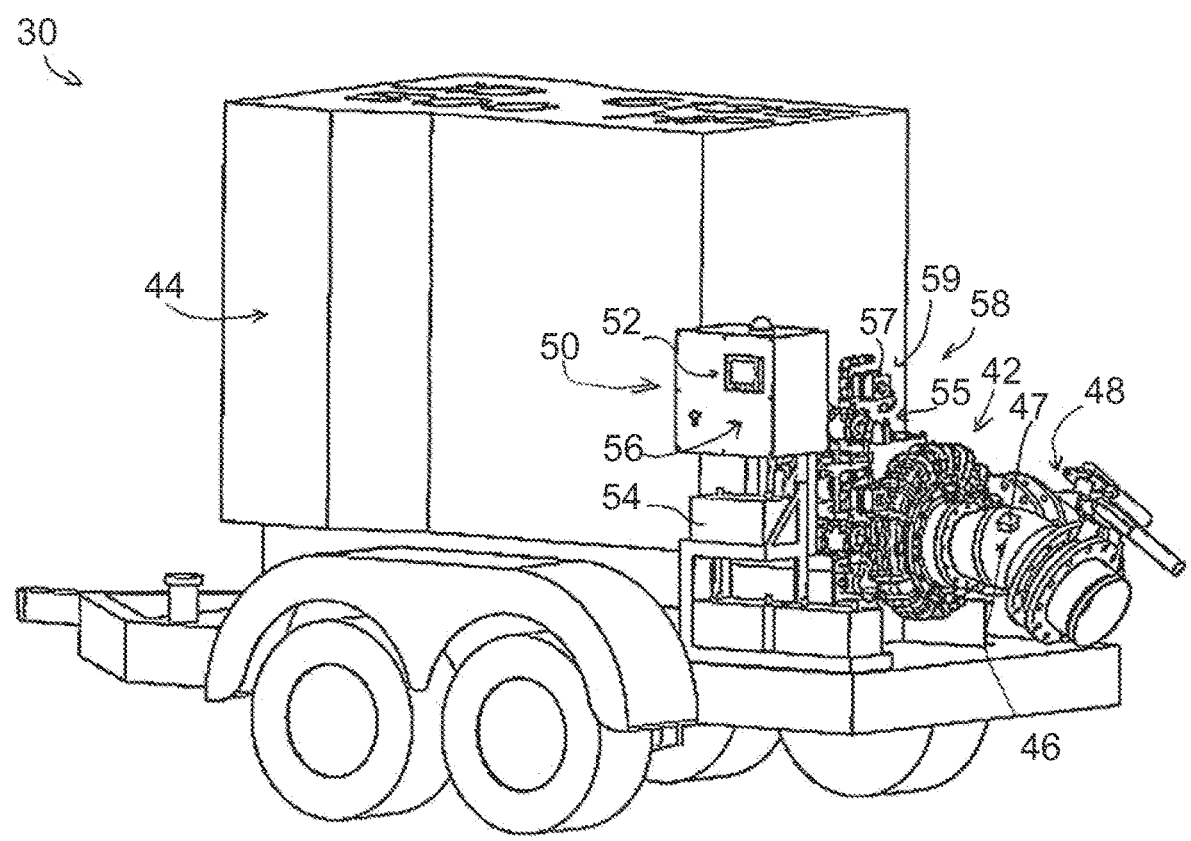
FIG. 2 is a perspective view of a portable pump facility in accordance with one aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-9, aspects of the pump, pump facility and systems, and pump control systems are shown. In one aspect, system 20 which is a system for remote monitoring and control of pumping facilities includes a first portable pump facility 30. Additional pumping facilities similar to facility 30 (or in some instances identical to facility 30), such as facilities 32, 34, 36, 38, 41, 43 (or additional facilities) may be included with system 20. Facility 30 is an example of a representative facility. Facility 30 includes a pump 42 positioned on a bed of a trailer having a frame and wheels. A housing 44 surrounds an engine and is positioned above a fuel tank and/or covers a fuel tank. The fuel tank is positioned at a bed of the trailer generally between the wheels. The pump receives an intake conduit 46 and a discharge conduit 48. An input pressure sensor, such as a pressure transducer, is positioned at the intake side of pump 42. A signal wire electrically connects the pressure sensor to a controller 50. In one aspect pressure transducer is positioned within the casing of pump 42 at the inlet area. A pressure sensor 47 may be positioned at or on or within intake conduit 46. Intake conduit 46 communicates with pump 42 such as introducing fluid to or at an eye of an impeller of pump 42. A discharge pressure sensor, such as a pressure transducer is positioned at the discharge side of pump 42, such as, for instance, at discharge conduit 48. A signal wire electrically connects the pressure sensor to a controller. It may be appreciated that a wireless connection may also or alternatively provide signal communications. In one aspect the pressure sensor is positioned within the casing of pump 42 at the outlet area of discharge conduit 48. In one alternative aspect a conduit may run from the inlet and/or outlet area of the pump (or conduit) to the controller 50 where the conduit supplies fluid which applies a pressure to a transducer at the control 50. The transducer is configured to respond to changes in pressure and send a signal to the controller corresponding to an instantaneous pressure level representing the amount of pressure at the pump location. In one aspect, a pump 42 may comprise a centrifugal pump having capability/rating of 76 Barrels Per Minute @ 345 feet of head (3,200 GPM @ 150 PSI). An engine such as a 500 HP engine may be used to power the pump 42 and facility 30.

Pressure sensors are configured to detect a fluid pressure at any given time and may be configured to continuously monitor the state of pressure. A signal representing the amount of pressure may be passed to a controller 50 or control system to read, store and transmit the signal and the data represented by the signal. A signal representing the pressure may be provided at various time intervals, or at various time intervals the pressure may be determined (and the values stored). For instance, in one representative example, the inlet fluid pressure sensor may output an instantaneous pump inlet pressure signal at a predetermined time, for instance, at each 100 microseconds (or at some other time interval). Test ranges spanning a time interval may also be used to establish average pump pressures, such as selecting a test period of, for example, 10 milliseconds (or other time interval). Such instantaneous and average calculations may be used in the control of system 20 and facility 30.

In one aspect a controller 50 is positioned on or in association with facility 30. In one aspect controller includes a printed circuit board or other electrical appliance to hold programming information and undertake control of system 20. Controller may include a box in which is positioned the circuitry and interface equipment. In one aspect controller includes a processor which receives information from various devices such as sensors, antennas, user input devices and compares the information to one or more thresholds or data stored in memory, such as one or more pressure thresholds or speed thresholds or other data or other thresholds. Based on the comparison, controller may activate other systems or control other steps. Controller may also adjust systems based on user input setting target thresholds or data or overriding aspects of controlled systems or objects. Controller may be informed of target thresholds or comparison data by receiving user input via a user interface device and storing the input in memory. Input and output pressure data, radio signal data or other data or thresholds may be stored in memory by sending signals and information wirelessly to controller. A Wi-Fi unit may receive wireless control data and pass it to controller. Wi-Fi unit may be associated directly with controller or may comprise a separate component.

The monitoring, analysis, and data gathering techniques of the disclosure can be implemented in hardware, software, firmware or any combination thereof. In one aspect, facility 20 includes a controller 50 which may include a computer chip or circuitry configured to control the electrical operation of device 30 and associated features of system 20, including application software programs stored or used on controller 50. The chip or circuitry may be contained within the boxlike structure of controller 50. Controller 50 includes logic circuits and/or programmable or programmed code to coordinate and control operation of system 20. An application software program stored or used on facility 30 may also be used to control the operations of system 20. In other examples, various aspects of the techniques may be implemented within one or more processors, including one or more microprocessors, DSPs, ASICs, FPGAs, or any other equivalent integrated or discrete logic circuitry, as well as any combinations of such components. Such hardware, software, firmware may be implemented within the same device or within separate devices to support the various operations and functions described in this disclosure. When implemented in software, the functionality ascribed to the systems, devices and techniques described in this disclosure may be embodied as instructions on one or more non-transitory computer-readable medium such as RAM, ROM, NVRAM, EEPROM, FLASH memory, magnetic data storage media, optical data storage media, or the like. The instructions may be executed to support one or more aspects of the functionality described in this disclosure.

A graphic display 52 with user operated buttons may be included at controller 50. Inside box may also be positioned a telemetrics module 56 (communication system which may include cellular telephone communications and other communications) for communications. In one aspect the telemetrics module is connected to an antennae to assist in broadcast or receiving signals from other pump facilities, such as from facilities 32, 32, 36, 38, 40, etc. A Deutsch pin connection may be included in the box for configuration. A battery 54 or system of batteries may be included to assist in powering of control 50 or other components. Within housing 44 is an engine and wire harness and radiator fan and pluming for air intake and exhaust. An isolator may also be mounted on the suction or intake 46 to minimize bending forces upon drive shaft from engine and or impeller shaft from pump 42. Telemetrics module 56 may be positioned within box and is configured as or with a communication device configured to send and receive communication signals (which may be wired or wireless) to and from pump facility 30. A Wi-Fi unit may be included within or in association with controller 50 for wireless communications, including cellular, RF, satellite, GPS, internet and other wireless communications.

In one aspect pump facility 30 may include a primer system configured to prime pump 42 for operation. Primer system 58 may include an air eliminator valve 57 and a primer motor 59. The eliminator valve 57 may be configured to allow air from within the pump 42 to escape while the primer motor 59 draws liquid into a cavity of the pump 42. Primer motor 59 powers a pump used to draw water into main pump 42. For instance, motor 59 may be activated to power rotary vane pump 55 which creates a suction to draw fluid into intake 46 while also expelling air through air eliminator valve 57. Lines from air eliminator valve 57 may lead to a lower area of a trailer for convenient release of air and any fluid which may be expelled from the line. As shown in FIG. 8 and FIG. 9, a primer tap 53 receives a conduit which leads to primer system 58 and configured to draw to an inlet side of a rotary vane pump. Also shown in FIG. 8 is an inlet or suction pressure transducer 47. In one example, an outlet or discharge pressure transducer 49 is shown in FIG. 9. It may be appreciated that an electrical wire may be in communication between transducer 47, 49 and controller 50.

In a further aspect, a pump facility 30 is in communication with a pump facility 32 and/or additional facilities such as at 34, 36, 38, 40. It may be appreciated that a plurality of facilities may be utilized in system 20. In some operations it may be desirable to string numerous facilities 30 together to supply liquid across a long distance. In one aspect a conduit 31 will provide fluid communication between a facility 30 and an adjacent facility, such as at facility 32. A conduit 31 may include a hose which allows water or other fluids to flow from facility to facility. Different types of conduits 31 will impart different fluid flow characteristics. Some will impart greater friction than others. Facility 30 may also communicate with facility 32 and the other facilities by electronic means (whether wired or wireless). In one aspect facility 30 will communicate with facility 32 via cellular telephone or other signal technology. Each facility may also be equipped with internet connectivity and communicate via the internet connection or connections.

In a further aspect facility 32 will include a pump 42, housing 44, intake 46, discharge 48, controller 50, graphic display 52, battery 54, telemetric module 56 (or Wi-Fi) and primer system 58 as in facility 30. In one aspect each facility may include similar components.

As shown in FIG. 1, a plurality of facilities 30 are connected together with conduit 31. In one aspect each facility is also configured to communicate with adjacent facilities 30 and in other aspects each facility 30 is configured to communicate with each other facility of system 20. In a further aspect a facility 30 is configured to communicate with a centralized computer or server. In further aspects each facility 30 is configured to communicate with a centralized computer or server.

In one aspect a website or web portal is configured to display data pertaining to system 20. In further aspects each of the facilities 30 of system 20 may be represented on the website or portal. Each facility 30 may be represented graphically or as a geographical position on a map. An actual image of a facility 30 may be presented on a photographic map.

In further aspects, information concerning each facility 30 and system 20 may be displayed on a variety of web pages. It may be appreciated that each individual facility 30, 32, etc. of system 20 may be included on a graphic or map, and all of the data and control functions for each facility are operable from the web portal.

In one aspect system 20 is configured to balance the load of pressure among the various facilities. For instance, a first facility 30 may draw liquid such as water from water source 60. Facility 30 will operate pump to draw fluid at a particular rate and pressure and pass the fluid to a second facility such as facility 32. The fluid travels through conduit 31 which connects between discharge 48 of facility 30 and intake 46 of facility 32. Facility 32 receives the fluid and passes it through conduit 31 to a third facility 34. It may be appreciated that the pump at facility 32 may be operating a different rate or pressure compared to the pump at facility 30 or 34. It may also be appreciated that imbalance between the rate of flow and pressures among the various facilities may disrupt the efficient flow of fluid or water in the system 20. Accordingly, pressure data detected at sensors at each facility is monitored and compared. Controller 50 receives the data and is configured to make automatic adjustment to the speed and power of the respective pumps 42 at the various facilities 30. In one aspect the speed and output or pressure produced at pump 42 at facility 32, for instance, will be automatically adjusted to match an input pressure of fluid received from facility 30 through conduit 31. In such manner a pump 42 at facility 32 may be adjusted to avoid cavitation issues or other problems that may occur with pumping. Other issues may include, for instance, a situation of "dead head" pumping, loss of water production or other occurrences that may cause problems with the pump 42 or facility 32. Each pump facility 30 may be configured to automatically adjust to data received from an adjacent facility 30 or from any of the facilities within system 20.

In a further aspect a control system is provided which is configured to automatically equalize or substantially equalize a fluid pressure measured between a first facility 30 and a second facility 32 with a fluid pressured measured between the second facility 32 and a third facility 34. The fluid pressure may also be controlled as between other facilities. It may be appreciated that various types and sizes of pumps and pump facilities may be used depending on the desired application. In one instance a pump may be paired with an engine having 600 horsepower where another pump may be paired with an engine having a 300 HP output. Depending on the application a user may mix and match the various types of pumps and engines and different types, styles, lengths of hose or conduit connecting the facilities. The geography and elevations may dictate optimal equipment to use to provide efficient flow of fluid at optimal expense in terms of fuel cost, equipment wear and tear, pressure delivery, volume delivery and other factors.

In yet a further aspect a control system is provided which is configured to automatically optimize the fluid pressures as noted above. For instance, there may arise a situation where having a fluid pressure of greater value between adjacent facilities is desired as compared to having an equalized pressure. For instance, where the terrain between facilities varies in elevation or where increased/decreased pressure between facilities leads to efficiencies in terms of fluid flow, use of fuels or other factors is considered. If a facility may be operated with less fuel use it may be desired to alter the output of the facility provided the efficiency of the entire system 20 may be optimized. Software and programming logic may be used to determine an optimal pressure producing scenario (or fuel consumption scenario) for each facility.

In further aspects the system is an engine or motor driven centrifugal pump system that reduces the need for operator interaction and skill level when compared to a conventional engine driven pump system. The system 20 also reduces the risk of operating the pump 42 in a manner that will reduce the life cycle of the components used to design the pump (for instance, reduce or eliminate cavitation).

In one aspect, when the pump control panel is turned on, it acquires a communication signal. When the communication signal is achieved, or the function is overridden, the control panel requires the operator to answer a series of questions. A first question may be to distinguish whether the pump is a "draft" pump or "relay" pump. A draft pump is the pump located adjacent the reservoir or pond and initiates a pumping of the fluid from the reservoir. A relay, or booster pump, typically receives fluid from an upstream pump and moves the fluid downstream to another pump, holding tank or other discharge. An additional question asks for the desired pressure for the pump system. The operator may also be asked to "arm" the system (i.e., have the system poised for operation). When the system is armed an alarm will sound and the pump will transition to a state of arm or draft. A 30 second alarm, for instance, may be a beacon styled light and sound. When a pump is in the draft state (i.e., drawing fluid form a pond or other source), a prime system 58 automatically triggers and the engine is started immediately following the 30 second Alarm/Delay. A different delay duration may be programmed or selected. When the prime system is triggered an air eliminator valve is opened simultaneously with the start of the primer motor 59. The air eliminator valve allows the air that is being evacuated from the pump to freely escape the system. A primer motor will continue to run until water is drawn inside the pump cavity. When water reaches the eye of the impeller it is sensed by a sensor (typically in a draft mode). This sends a signal which shuts off the automatic prime system (draft mode). When the water reaches the eye of the impeller the pump senses a positive inlet pressure (relay mode). This sends a signal to trigger the second warning alarm (which may be 30 seconds, for instance) and then the pump will start (relay mode). Following, the pump transitions into a working state.

When the pump is in a working state the main engine or motor driving the pump may increase in speed until the operator selected pressure setting is achieved. If the operating conditions don't allow for the pump to reach the selected pressure setting, the pump operates at the greatest achievable pressure. The pump continues to maintain the selected pressure as long as the operating conditions don't change (i.e., loss of prime, restricted inlet conditions, draft height doesn't change, etc).

In one aspect to ensure smooth operation the pump is equipped with an automatic cavitation reduction system. The pump inlet and outlet pressure transducers monitor the internal conditions of the water moving through the pump 42. When the pressure on the inlet side (intake 46) of the pump reaches a threshold position (as determined by the controller upon receiving the corresponding pressure signal), the controller 50 will interpret a condition of cavitation. When cavitation is sensed the pump decreases its performance until the cavitation is eliminated. Such performance is decreased automatically by the controller by reducing the speed of the engine, for instance. If cavitation does not go away the automatic cavitation reduction system activates if draft mode is selected. If this occurs when the pump is in relay mode (i.e., a relay or booster pump as opposed to a draft or originating/drawing pump) the pump will go into an armed state. While the pump is running, diagnostic information is logged and warning alarms may be sent to the operator via the control panel, text messages, email, and the web portal (provided telemetric communication or other wireless signal is attainable). The alarms include but are not limited to warnings or data display concerning engine oil temperature and pressure, pump oil pressure and temperature, engine or motor speed, low oil conditions (low oil level), low fuel level, cavitation alert, preventative maintenance alarms, and loss of water alert. The pump data available to the operator includes but is not limited to the flow rate, the pressure, the engine speed, the total system hours, the hours the system has been operated since the last shutdown, and the fuel level. The operator also has the capability to control the unit from remote locations. These features include system shut down, start up, pump pressure setting control, and operation mode (relay or draft). The pump is equipped with diagnostic fault codes which are available remotely and on the operator panel. Maintenance timers are resettable at the operator's panel to ensure they are configured.

The remote control smart pump system provides any applicable industry the means to remote control all of the pump operations, data log system information, remotely access operating conditions, receive remote warning alarms, remotely view diagnostic code information, and configure the system to automatically adjust to changing conditions to equalize and/or optimize flow rates and facility efficiency. The system and pumps are also configured to maintain ideal operating conditions without the need for operator intervention. This improves the overall life of the pumps and facilities.

The system includes a driving source equipped with engine control communication interface (motor or engine), a centrifugal pump equipped with inlet and outlet pressure transducers and an optional mag-flow meter, a drive connection, a fuel tank, an I/O communication module, an I/O control panel, a priming system, air eliminator valve, transmission oil temperature and pressure senders, a fuel level sender, and a fuel tank.

The system has many uses including for water transfer applications, firefighting applications, construction applications, or agricultural applications. The system is particularly well-suited for hydrofracturing operations which require a constant and reliable source of supplied water or fluids. In some applications a redundant facility may be situated at each node of the system so that standby equipment is on hand ready to be implemented in the case of a failure.

The plurality of facilities may be moved to different locations and tracked or traced with GPS. As each facility may be configured to operate a priming action, each of the facilities may act as the initial or priming facility in the chain.

Figure 3:
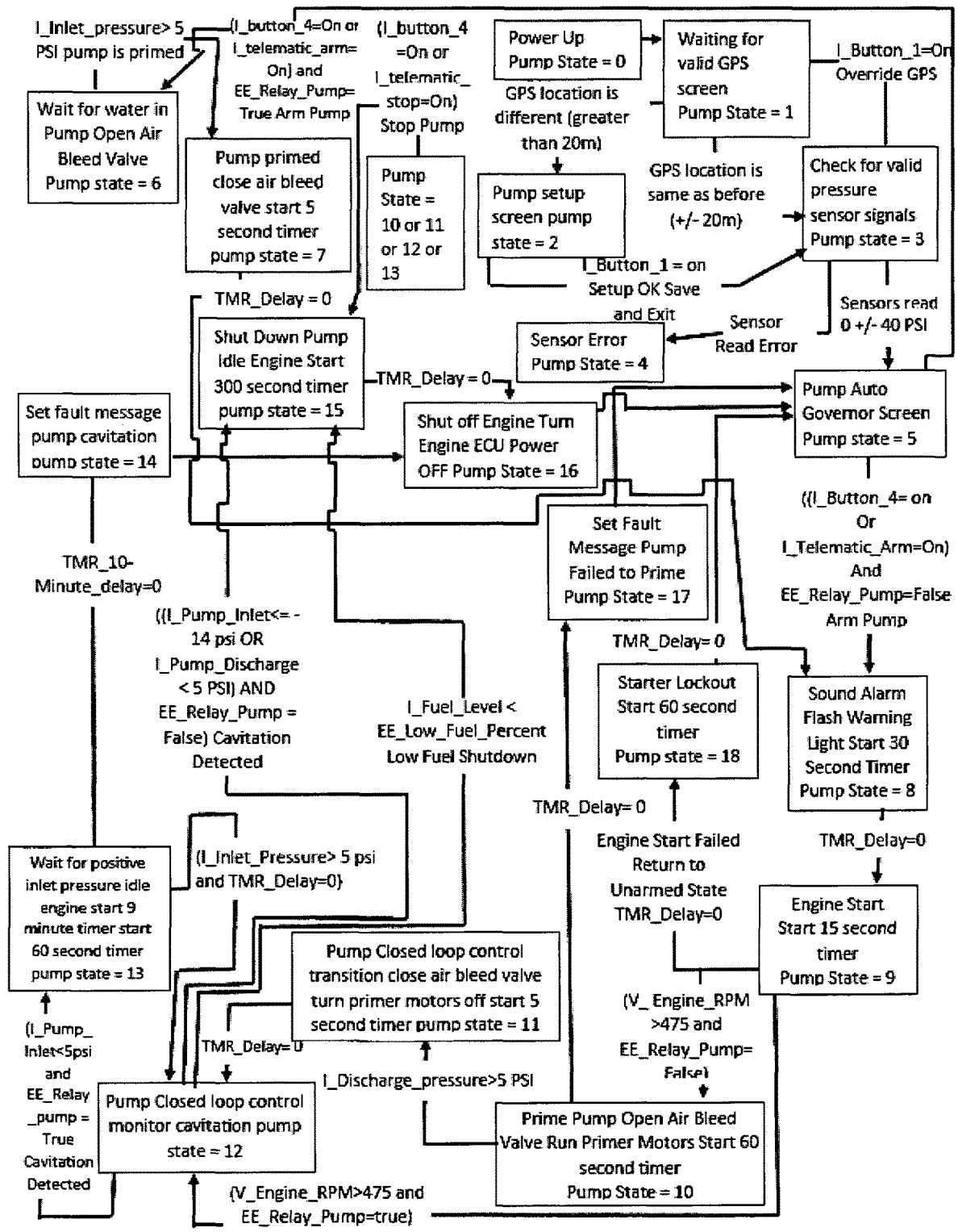
FIG. 3 is a flow diagram in accordance with an aspect of the present invention.

FIG. 3 is one representative flow diagram of computer operation of a facility 30 or system 20. There are various "pump states" noted throughout the figure and various selections have been made as to timing, pressures, speeds, and other aspects that may be modified as desired or to fit a particular application. It may be appreciated that other or additional steps and timing sequences may be utilized. The flow logic shown in FIG. 3 may be used to program the controller 50. It may be appreciated that the controller 50 may be reprogrammed as desired to achieve different operations as desired.

It may be appreciated that each facility 30 may be equipped with GPS or other tracking devices. In the event a facility is moved a set distance (in one instance, a distance greater than 20 meters) the facility and control may undertake a reset function. A pump setup screen may prompt a user to reset the pump with desired pressure and other information settings for operation of the facility at the new location.

Figure 4:
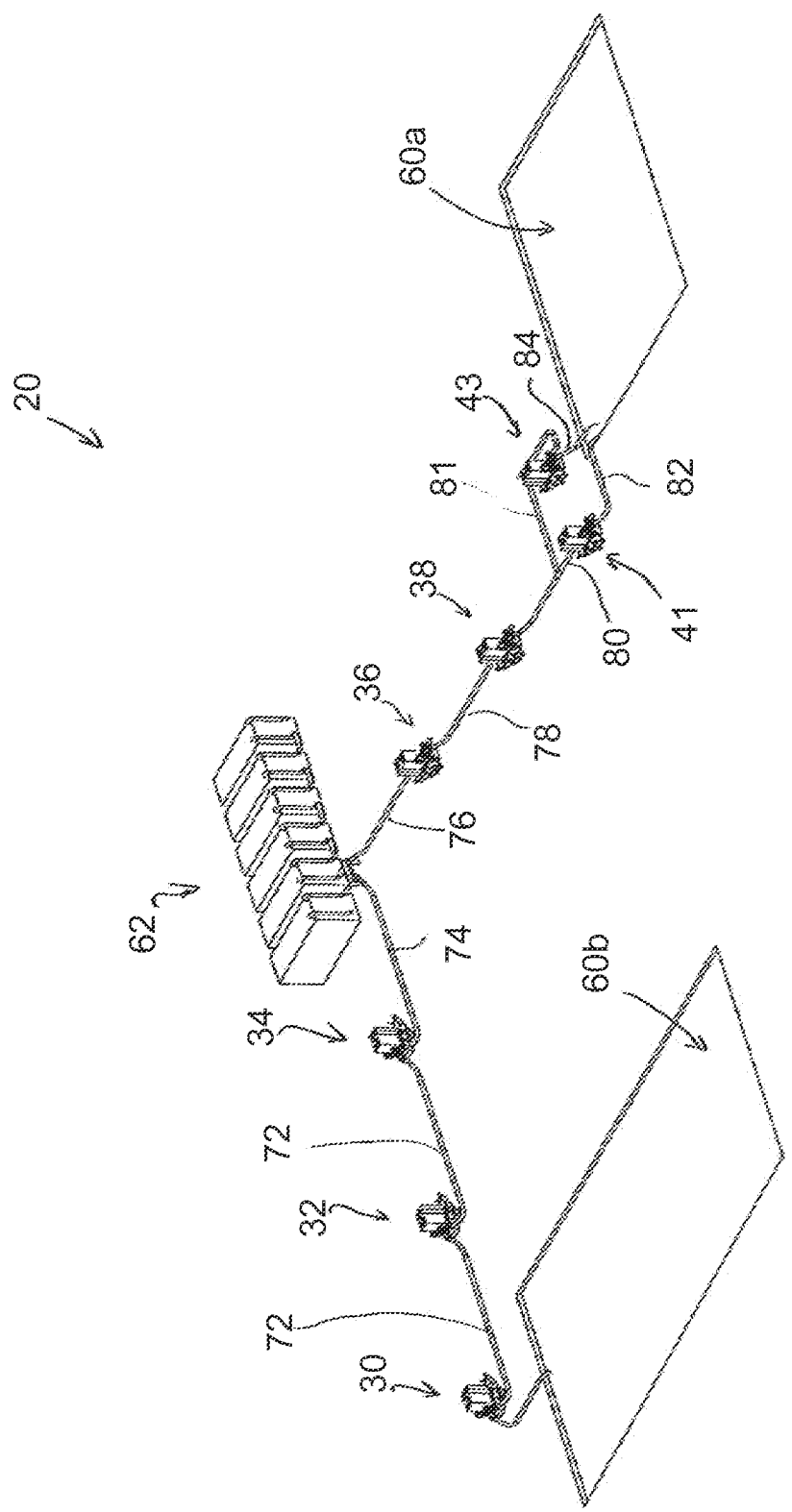
FIG. 4 is a perspective view of a system in accordance with a further aspect of the present invention.

In a further aspect with respect to FIG. 4, an example of a system 20 of the invention is provided. FIG. 4 shows a set-up of a water transfer system which moves water from a reservoir 60*a* to a series of holding tanks 62. In this example the pump string that is being supplied from reservoir 60*a* has two draft/supply pump facilities 41, 43 configured in parallel. It may be appreciated that in many instances a parallel arrangement accommodates for pumping of a greater volume of fluid as compared to use of a single draft pump. The pump string that is being supplied from reservoir 60*b* has one pump 30 (a single draft pump) supplying the entire line. In one aspect the controllers 50 of each facility 30, 32, 34, 36, 38, 41, 43, for instance, may be programmed with the same or similar flow logic, such as the logic shown in FIG. 3. Alternative flow logic may also be used, such as the logic and functionality shown in FIG. 5.

In operation, when a draft pump such as a pump at facility 30 is activated (or at facility 41, or 43, for instance) an alarm will be triggered and the pump 42 will be set to be powered upon expiration of a 30 second delay. The alarm may include a visual signal and/or audible alarm or other indicator or alarm to warn nearby persons of an impending activation of the engine and pump. A different delay interval may be set as desired. Upon lapse of the 30 second delay, the engine associated with facility 30 will activate which in turn drives pump 42. It may be appreciated that powering of the engine will power the pump 42 via a direct drive coupling or via a clutch or other connection. When the 30 second alarm has expired the engine is automatically started. A primer begins to operate. Once the primer system 58 has drawn water from source 60 to the impeller eye of the pump 42 the primer will shut down and the pump engine will increase speed to achieve an operator pre-set performance level. For instance, an operator may enter a setting in the controller so that the engine speed will increase to 1500 RPM (or some other desired speed). A corresponding pressure (at both the inlet and discharge) will be achieved when the engine operates at a particular speed. When the draft engine is running to speed it will draw water from source 60 and pass the water along to a holding tank 62 or relay/booster facility such as facility 32.

A relay pump 42 such as at facility 32 and associated controller may be programmed in "relay" mode (as opposed to "draft" mode) in which case a user may select an "arm pump" option at a control panel display. It may be appreciated that a facility may be programmed in either draft or relay mode as needed or desired. When pump 42 has been armed an alarm light (and/or siren) may be activated at the pump facility. The alarm light will stay on for 30 seconds (or other interval as desired). Once the 30 second timer has expired the pump 42 will enter an armed state, which means the facility is poised to activate. When the pump 42 is configured in an armed state an air eliminator valve 57 is opened. When water being pumped upstream to the facility 32, for instance, and reaches the pump inlet at intake 46, for instance, an automated engine start is triggered. The sensor at intake 46 will sense the presence of fluid and send a signal to the controller 50 which in turn activates the engine. When fluid exits the discharge 48 (as sensed by a sensor at such location) the air eliminator valve will automatically close. The engine speed will then increase to achieve the operator pre-set performance pressure level. For instance, the operator may set the discharge pressure to be 150 PSI. The engine speed will increase until the desired or set pressure is achieved. Accordingly, system 20 may include operation of draft pump facility 30 which supplies fluid to relay pump facility 32 (or to multiple relay facilities) for delivery to a holding location or for direct use. It may be appreciated that a series of pumps and facilities may be armed so they are ready to receive and relay fluid along the line. Such activation and control may be accomplished remotely.

It may be appreciated that a variety of events may be monitored and controlled by controller 50. For instance, upon activation of a controller, a warning light or other signal on the pump facility 30 is activated and a display message populates on the operator panel 52. An alarm notification is also sent to a remote operation website or web portal or other remote location or facility to provide information and data that the facility is activated. If a telephone or e-mail or text message or other distribution list is provided (by entry of data into controller or into an associated remote database) respective messages will be provided to the distribution list. A variety of information and data may be collected, stored and distributed as desired. Such information may include event defaults or data storage associated with a variety of matters, including pump oil pressure readings and warning of low pressure, pump oil temperature and warnings, system voltage, fuel level, activation of pumps, stopping of pumps, speed of engine, pump cavitation detection, water loss detection, among other data.

Various automatic operations and warnings are programmed into control 50. For instance, if an obstruction is blocking water from being expelled from a pressurized feed line 72, termination line 74 or discharge extension, the pump 42 will return to idle and an alarm is triggered. Such blocking of water is often described as a "dead head" condition. When in idle state, the engine may continue to run but at a lower speed, which in turn may also cause the impeller of pump 42 to also turn at lower speed; alternatively, facility 30 may be configured with a clutch mechanism which stops action of the pump. The alarm may continue for a 30 second period, for instance, to allow an operator an opportunity to remove the obstruction if possible (such as by opening a valve that was erroneously closed).

Figure 5:
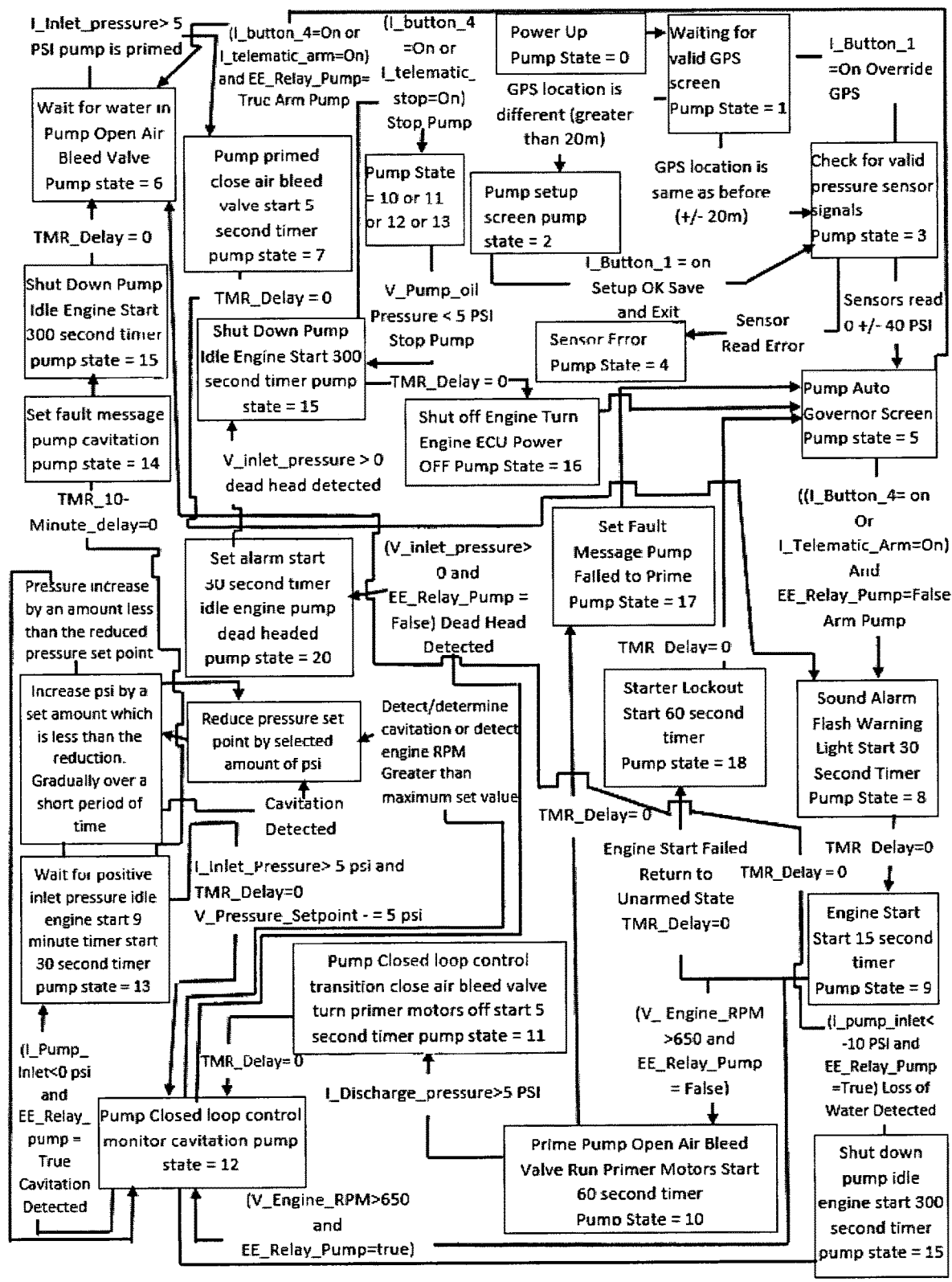
FIG. 5 is a flow diagram in accordance with a further aspect of the present invention.
Figure 6:
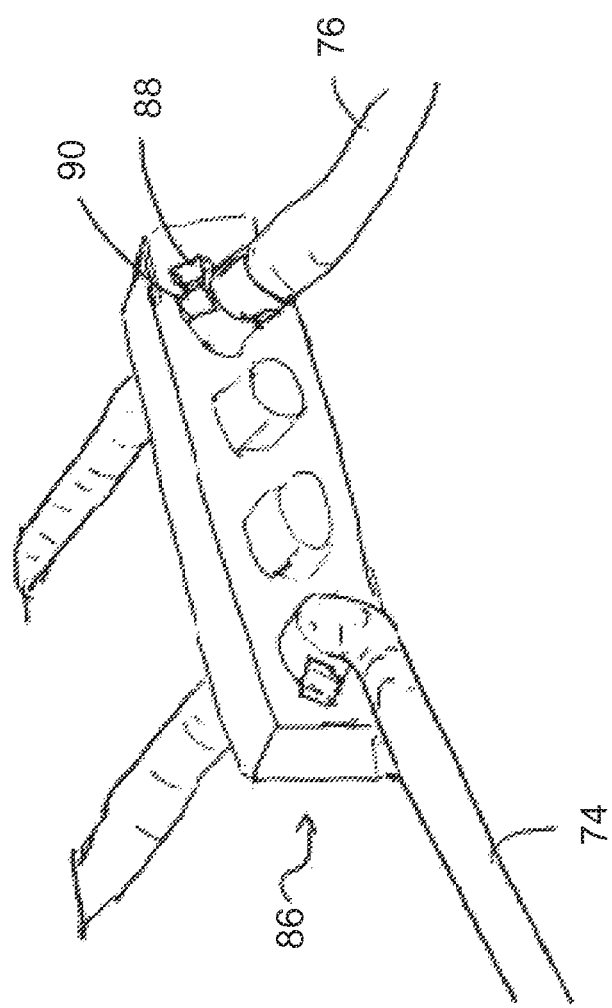
FIG. 6 is a perspective view of a component aspect for use in conjunction with the present invention.

In another instance, facility 30 and controller 50 are configured to automatically adjust during a condition where there is an obstruction or block inlet flow to the pump 42. In such case the pump might otherwise experience a cavitation event. If water being lifted by the pump, on the suction side (i.e., the inlet) is restricted, the controller is configured to make automatic adjustment to the engine. The controller is configured to sense the pressure at the inlet and discharge areas of the pump and also to sense the speed of the engine which relates directly to the speed of the pump impeller. There exist a variety of ways to detect or determine whether a cavitation event occurs: such as comparing the inlet pressure to the discharge pressure of the pump, or comparing discharge pressure increases to speed changes of the engine (which may indicate a mismatch in the efficient supply and discharge of the pump). There may be other factors considered in determining whether a cavitation event occurs, and the severity of such events, and the same may be set into programming logic of the controller. Different sensitivity levels may be established for determining how efficient the pump is running. Readings may be taken over a period of time to calculate an average of occurrences of inefficient pump activity and then the controller may undertake correction measures to prevent or reduce the cavitation event. In one instance, a cavitation event may be defined by a user as a state where the pump inlet pressure is less than −14 PSI (or some other amount or range of pressure) or where the pump discharge is less than 5 PSI (as in FIG. 3)(or some other amount or range of pressure). In such instance, the facility may be shut down. For instance, the engine may idle for a period of time (such as 300 seconds as recommended by some engine manufacturers) after which time the engine will shut down ("turn off") and the pump impeller stops. A user may define alternative cavitation events which will trigger such engine and pump shut down. In a further aspect as shown in FIG. 5, a cavitation event may occur when the pump discharge pressure increases an amount that is less than expected when the speed of the engine is increased. It may be appreciated that various ranges of speed and pressure may be set by the user depending on the type of pump and other circumstances (or depending on how sensitive the triggers are set). Once the inefficient pump activity is detected (most often "cavitation"), the controller triggers an alarm and the pump/engine will be shut down.

In one aspect, for instance, settings of the controller 50 may be set to determine a cavitation event where the engine speed increases a certain amount over time and where an expected discharge pressure changes by an amount that is less than expected, suggesting a mismatch in the amount of water pressure within the pump in relation to the speed of the impeller which further suggests cavitation. For instance, a cavitation event may be defined as an engine speed increase of more that 50-100 RMP (or some other set value) over a 0.1-2.0 second interval (or some other time interval), while an input pressure (or output pressure) increases less than 1-5 PSI (or some other amount). Different ranges or sensitivity may be programmed depending on the nature of the pump and application circumstances. In other aspects, a cavitation event may be defined, for instance, as an engine speed increase of 120 RMP over a 2 second interval with a discharge pressure increase of less than 5 PSI, for instance. An alternative cavitation definition or setting may include an engine speed change over 1 second greater than 60 RPM and a discharge pressure increase of less than 2 PSI. A cavitation may be defined in other ways, including a relationship between engine speed change and pressure input change, engine speed change and pressure output change, input pressure change alone, output pressure change alone, or other criteria that may be established to determine undesired (or poor) pump performance. The determinations may be based on instantaneous and/or averaging data. For instance, pressure sensors may supply data to the controller which calculates average input/output pressures, engine speed, and determine maximum and minimum inlet/outlet pressure values for each designated time frame (such as a 100 millisecond time frame or other time frame). The controller may also perform other processing of the signals in order to compare the varying pressure signals to a cavitation signature of pressure signals indicative of cavitation. A clock program may also determine the end of a time interval, such as a 100-millisecond time frame, test for the end of a 1 or 2 second time period, and process inputs and outputs. The clock program may also set a period of time for generating or reading pressure signals at particular intervals for particular time frames, such as for every 100 microseconds. An average fluid pressure and an instantaneous fluid pressure may be used for determining cavitation. Controller 50 determines pressure (inlet or output) during a selected time frame of, for example, 1 second, as established by a clock program. The average pressure is calculated based on each of the instantaneous pressure readings from the pressure sensor(s) during the 1-second time interval. The calculated average pressure signal is compared to a minimum (or maximum) preselected average pressure value set by the user or pump manufacturer. If the calculated average pressure drops below or above a preselected average pressure and stays below/above the average for a preselected time period, i.e., one second, the controller generates an error signal to shut down the engine/pump.

The shut-down of the engine/pump may also result in response to instantaneous pressure (and even engine speed) signals from the sensor(s). Sensors, such as input sensor 47, or output sensor associated with discharge 48, provides an instantaneous pressure signal to the controller each 100 microseconds, for instance, in response to the clock program. During a selected time frame, for example, 10 milliseconds, all of the instantaneous pressure signals obtained every 100 millisecond are checked, and the maximum/minimum pressure signal detected during this 10 millisecond time frame are determined. If the difference between the lowest/highest instantaneous pressure signal as exceed (or do not meet) a parameter set by the user or the pump manufacturer, a count is increased for the 1-second time frame. Each time the a difference between the instantaneous pressure signal and the designated pressure signal during a 10 millisecond time frame is exceeded (or not met) another count is generated which indicates an unacceptable sensed magnitude variation in the instantaneous pressure. At the end of the 1-second time frame, the counts may be compared to a predetermined user or factory parameter, and if the count exceeds the parameter (such as 10 counts during a selected time frame), a fail or warning signal is generated (with corresponding engine shut down if warranted). It may be appreciated that different or various time frames and intervals and various pressure readings and speed readings (or other parameters) may be used to define a failure or poor performance event.

In an alternative aspect, once the cavitation is detected, the pump/engine may idle for a set period of time, such as 30 seconds. During the idle period, the operator set performance pressure (i.e., the pressure value set by the operator at set-up, such as 150 PSI, for example) will be automatically reduced by the controller a set amount (for instance, a reduction of discharge set pressure by 20 PSI). When the idle period lapses, the engine speed is increased to achieve a pressure level that is less than the previous set-up pressure. For instance, the engine speed may increase or ramp upward such that the ramp-up pressure level is at 140 PSI. If the ramp-up pressure level cannot be achieved (due to continued cavitation, for instance, which may be caused by an obstruction or blockage, for instance), the alarm will trigger and the sequence will start over. For instance, a further reduction of discharge set pressure by 20 PSI may occur (140 PSI−20 PSI=120 PSI), with a corresponding ramp-up speed in an attempt to achieve a new ramp-up pressure (for instance 120 PSI+10 PSI=130 PSI) to determine if the new ramp-up speed supports efficient performance.

Figure 7:
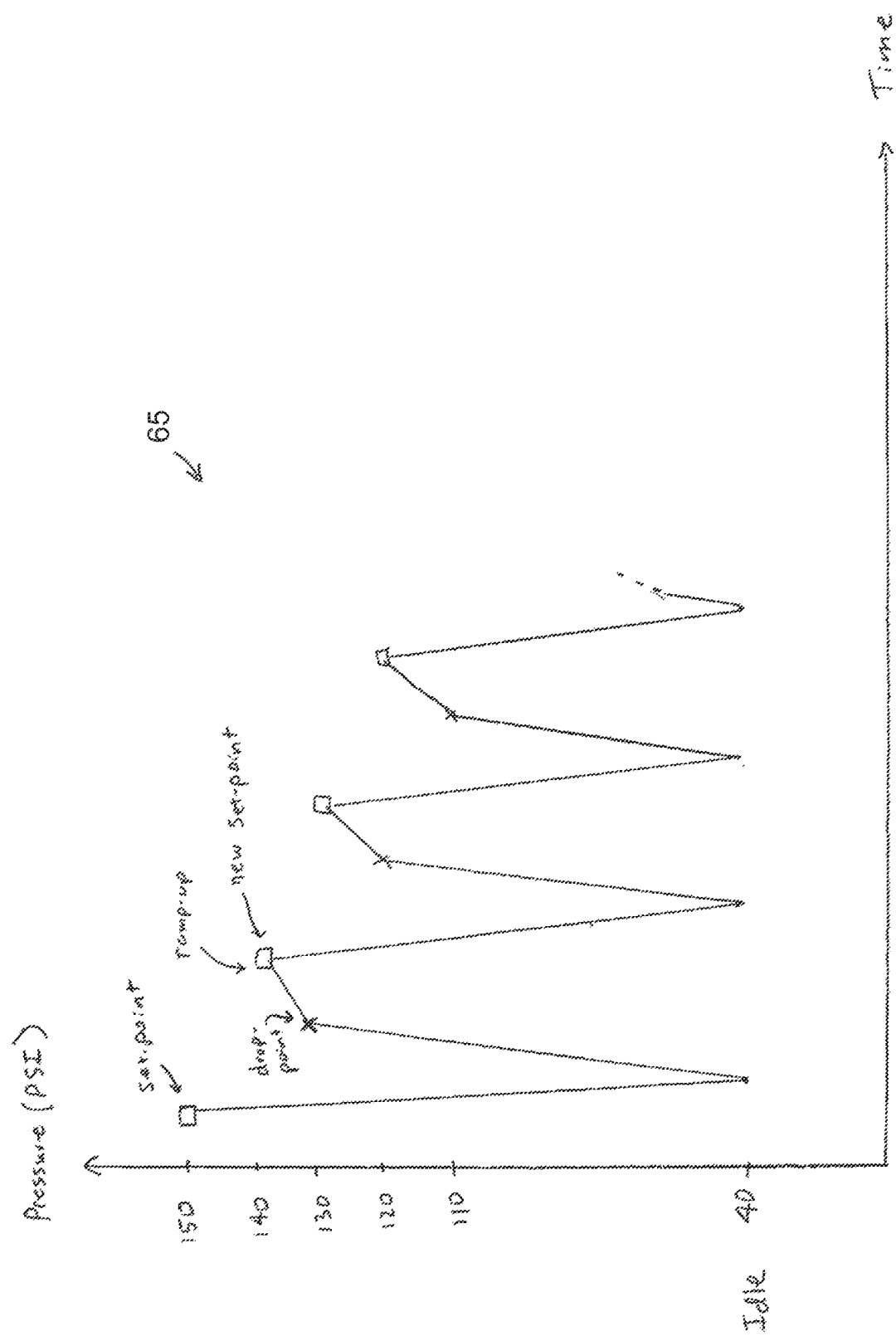
FIG. 7 is a graph depicting a system in accordance with a further aspect of the invention.

In a further aspect with respect to FIG. 7, one example of a cavitation reduction system 65 is shown. Controller 50 is configured with settings in an attempt to achieve a stable pressure setting for pump 42. In one example a set-point pressure may be set at 150 PSI. For instance, the engine speed runs so that an output pressure at pump 42 is 150 PSI. Upon detection of a cavitation event, controller 50 causes the engine to idle which results in a significant reduction in pressure, which in this instance is represented at an idle pressure of 40 PSI. After a time interval, the controller automatically increases the engine speed to attain a "drop-point" pressure of 130 PSI, for example. In one aspect, the engine speed may be gradually increased to a "ramp-up" speed, such as at 140 PSI. If the pump does not experience further cavitation, the "ramp-up" speed becomes the new set-point. The pump will continue to operate at this stable set-point until or unless another cavitation or other disruption is detected or the system is controlled to be shut off or otherwise modified. If a stable pressure cannot be maintained at the ramp-up level (140 PSI, for instance), the control will perform another engine speed idle and the pressure will drop again, to 40 PSI, for instance. The cycle will repeat with a further increase in engine speed to a drop-point (in this case the drop point will be 20 PSI less than the previous set-point, or 120 PSI) with another ramp-up to a ramp-up level (i.e., 130 PSI). The cavitation reduction system will continue until a stable pressure is achieved or the system is shut down It may be appreciated that the set-point discharge pressure value of the pump is defined by a user or pre-set by a manufacturer by designating or inputting/programming the PSI discharge pressure value into the controller (i.e., the output pressure value at which the facility is desired or programmed or controlled to run, for instance the pre-set discharge pressure may be set at 150 PSI, which is the set-point discharge pressure value of the pump]

The referenced ratcheting or continuous testing at ever-increasing/decreasing speeds and pressures is designed to automatically allow a facility to achieve efficient and safe performance without having a complete shut-down and without having a user continually troubleshoot by making repeated manual adjustments. Such continuous testing and monitoring may be performed remotely. Once the facility is able to maintain a set pressure/speed for efficient operation, the controller may also test the pump by increasing the speed/pressure to possibly return to a previous set-up level (or to maximize or optimize the set-up if possible). If the engine speed is reduced to an idle and the pressure (and pump performance) still cannot be achieved or maintained, the engine will shut down.

In a further aspect, control 50 will provide an automatic "loss of water" protection feature. When a facility or pump is configured as a relay pump and is positioned downstream from a supply of water (such as from a water tower, pressurized water source, draft pump, etc.), and such relay pump 32 is not receiving water from the pressure feed line 72 and the pump 42 is in a running state (i.e., the engine speed is greater than 650 RPM), the controller 50 is configured to trigger an alarm and/or automatically shut down the pump 42 (and/or idle the pump 42 for 300 seconds, for instance, and then shut down the engine/pump). When the pump is shut down, it enters an "armed" state, such that it is poised to restart upon sensing the presence of water at the inlet.

In a further aspect where at least two facilities 30 or a sting of facilities 30 are connected in series and one of the performance settings is adjusted (such as but no limited to an operator adjusting a setting of the discharge pressure of a pump), controller 50 will automatically adjust settings on another facility. This is an automatic load leveling within the system. Such automatic adjustment may occur to optimize fuel efficiency within the chain or line of facilities. For example, in one aspect an operator may present the following initial settings for system 20 (See FIG. 1):

Example 1—Initial Setting

| PUMP Reference (FIG. 1) | Operator Set Discharge Pressure | Resulting Inlet Pressure | Resulting Engine Speed | Initial Pressure Set By Operator |
|---|---|---|---|---|
| 30 | 130 PSI | −12 PSI | 1740 RPM | X |
| 32 | 150 PSI | 20 PSI | 1740 RPM | X |
| 34 | 150 PSI | 30 PSI | 1661 RPM | X |

Settings after Pump 30 Discharge Pressure is Changed from 130 PSI to 150 PSI:

| PUMP Reference (FIG. 1) | Operator Set Discharge Pressure | Resulting Inlet Pressure | Resulting Engine Speed | Operator Pressure Adjustment | Automated Speed Adjustment |
|---|---|---|---|---|---|
| 30 | 150 PSI | −12 PSI | 1850 RPM | X | |
| 32 | 150 PSI | 40 PSI | 1503 RPM* | | X |
| 34 | 150 PSI | 30 PSI | 1661 RPM | | |

NOTE: Asterisk indicates an automated adjustment.

It may be appreciated that the same discharge pressure may be maintained by lowering the engine speed. The above data are approximate to +/−5 PSI and +/−20 RPM.

Example 2—Initial Settings

| PUMP Reference (FIG. 1) | Operator Set Discharge Pressure | Resulting Inlet Pressure | Resulting Engine Speed | Initial Pressure Set By Operator |
|---|---|---|---|---|
| 30 | 130 PSI | −10 PSI | 1740 RPM | X |
| 32 | 120 PSI | 20 PSI | 1424 RPM | X |
| 34 | 150 PSI | 30 PSI | 1661 RPM | X |

Settings after Pump 32 is Adjusted from 120 PSI to 150 PSI

| PUMP Reference (FIG. 1) | Operator Set Discharge Pressure | Resulting Inlet Pressure | Resulting Engine Speed | Operator Pressure Adjustment | Automated Speed Adjustment |
|---|---|---|---|---|---|
| 30 | 130 PSI | −10 PSI | 1740 RPM | | |
| 32 | 150 PSI | 20 PSI | 1740 RPM | X | |
| 34 | 150 PSI | 60 PSI | 1500 RPM* | | X |

NOTE: Asterisk indicates an automated adjustment.

It may be appreciated that the above examples may also be used with the system shown in FIG. 4.

Such load leveling eases the task automatically for an operator. An operator may attend to the adjustment and monitoring remotely. An operator may log into a web based user account to control and monitor operations. The operator can send data to respective pumps or facilities 30. An operator may remotely control, for instance, the starting of a pump (draft mode), arming a pump (Relay mode), shutting down an engine, and adjusting pressures and speeds, among other operations. Real time data is monitored by any device or controller that has access to an internet connection. Field data can be viewed for any of the pumps or facilities of a system 20. The performance data of a pump or facility is transmitted (via a wired connection or optionally via Radio Frequency, Wi-Fi, telematics, or other wireless delivery) to a web portal (which may be secured) and is visible in a historical data section of the portal or program. The data may be exported into a spreadsheet or otherwise exported or delivered and used for reporting and further control or monitoring or developments. Delivery directions for re-fueling routs may be mapped for delivery to a facility or multiple facilities. The routing may be generated from the web portal and delivered to delivery vehicles or facilities. Engine diagnostic information is displayed locally on the control panel and also remotely where it may be analyzed and stored and used for development.

In a further aspect, the controller 50 may accommodate for a hose burst protection feature. In one aspect with respect to FIG. 4 when a pressure fee line 72 (or 78, 80) completely bursts, the pump facility immediately upstream from the ruptured pressure feed line will lose its ability to create system pressure. This triggers a shutdown sequence at the pump immediately upstream from the ruptured line. For instance, if line 78 bursts, pump facility 38 will shut down. When the pump shuts down its discharge valve is automatically closed. This causes the supply/draft pump (i.e., at facility 41, for instance) to enter a dead head state. The draft pump will therefore shut down (i.e., the engine will shut down immediately, or idle for a set time and then stop running). At such time all of the pumps downstream from the supply line 82 will experience a loss of water alarm followed by a shut down. In situations where pumps are configured in parallel, such as pumps at 41, 43, the pressure feed lines 80, 81 expelling liquid form the draft or supply pumps 41, 43 may include a one-way check valve allowing flow to enter the pressure feed line where the two lines are joined together.

In a further aspect, in one example the pressurized termination line 76 may burst. This causes an automatic reaction where the pump at facility 36 is unable to maintain system pressure as the water is expelled to atmosphere resulting in little to no back pressure. Pump 36 will shut down and the discharge valve will automatically close. The flow in pressure feed line 78 will be blocked resulting in a dead head condition on the supply lines 82, 84. When pumps at facility 41 and 43 shut down due to the dead head protection they trigger a reaction down the line. Pump at facility 38 shuts down due to the loss of water protection feature address previously.

In a further example, where the pressure feed line 78 bursts, pump 36 will shut down due to the loss of water protection feature. The pump at facility 38 will shut down simultaneously with the pump at 36 due to the lack of back pressure in the line. This causes the discharge valve on pump 38 to close. When the discharge valve at pump 38 closes, the supply pumps (pumps at 41, 43) shut down due to the dead head protection feature. It may be appreciated that pumps may be of similar design, size and style or a variety of different types of pumps may be used while still allowing controller to automatically adjust settings for efficient operation.

In a further aspect the controllers 50 of respective facilities 30 may be configured to communicate directly with each other or through a network system, point-to-point network, or mesh network. Pump and engine efficiency data may be sent from one pump station to the next or to all or other pump stations or facilities (or to a common server or controller). The data and communication signals may be sent wirelessly via Wi-Fi, Radio Frequency, hard wired cables, or other means of communication. With such networking communication a system 20 may be optimized for energy efficiency and fluid flow, similar to the load leveling features address above. In addition, the communication may flow up stream whereas the load leveling may be limited to communication downstream. Such upstream communication provides the pump system the ability to fully optimize efficiency within the chain by eliminating extra pressure or flow at a given pressurized termination line (such as at line 74, 76) without the aid of an operator following initial set up settings. A flow meter, such as at 88 is associated with termination line 76 and manifold 86. See FIG. 5. A pressure transducer 90 configured to communicate with a pump controller 50 (or several pump controllers 50) is also associated with termination line 76. Transducer 90 and flow meter 88 may be configured with manifold 86 and/or associated directly with line 76 or both. Transducer 90 and flow meter 88 are configured to provide signals or sensor information to controller 50. A pressure transducer 90 and a flow meter 88 may be associated with each termination line 74, 76 to obtain separate readings of separate lines and systems. It may be appreciated that water may be pumped from a reservoir to another reservoir with or without a manifold or with or without a holding tank, and a flow meter 88 and pressure transducer 90 configured to communicate with the controller 50 or respective controllers 50 are coupled with the termination lines or lines. The controlled system is also configured to shut down or turn on a relay line (i.e., a series of facilities which operate as relay systems, such as facilities 30, 32, 34, for example). The controlled system is also configured to start and stop individual pumps in a set of pumps linked in parallel, such as shown in FIG. 4.

In one example with further reference to FIG. 4, a desired delivery rate of water flow may be pre-set for two individual lines, such as a preset volume of water to be delivered through line 74 and line 76. In the present example, a desired flow at termination line 74 is set at 2750 GPM with a pressure of 10 PSI. A desired flow at termination line 76 is set at 5000 GPM with a pressure of 10 PSI. Such settings may be made at the controllers 50 or remotely as desired.

Example 3—The Operator-Entered Set Up Information is Shown in the Table Below

| | | | Initial Settings | | | |
|---|---|---|---|---|---|---|
| PUMP Reference (FIG. 4) | Operator Set Discharge Pressure | Resulting Inlet Pressure | Resulting Engine Speed | Initial Pressure Set By Operator | Flow at pump asset | Operator Set Pump Type |
| 41 | 150 PSI | −12 PSI | 1850 RPM | X | 3200 GPM | Draft |
| 38 | 150 PSI | 40 PSI | 1503 RPM | X | 5300 GPM | Relay |
| 36 | 150 PSI | 10 PSI | 1740 RPM | X | 5300 GPM | Relay |
| 34 | 150 PSI | 70 PSI | 1265 RPM | X | 3200 GPM | Relay |
| 32 | 150 PSI | 30 PSI | 1582 RPM | X | 3200 GPM | Relay |
| 30 | 150 PSI | −12 PSI | 1850 RPM | X | 3200 GPM | Draft |
| 43 | 100 PSI | −10 PSI | 1425 RPM | X | 2100 GPM | Draft |

Note:
Pump 41 and 43 are set up in parallel

When the system is up and running the actual delivery rate at pressurized termination line 76 is 5300 GPM and the pressure is 70 PSI. The resulting delivery rate at pressurized termination line 74 is 3200 GPM and the pressure is 35 PSI.

The control system responds and makes the adjustments shown in the following table. The adjustment results in a total speed savings of 441 RPM.

| | | | Settings After Auto Adjustment | | | |
|---|---|---|---|---|---|---|
| PUMP Reference (FIG. 4) | Operating Discharge Pressure | Resulting Inlet Pressure | Resulting Engine Speed | Initial Pressure Set By Operator | Flow at pump asset | Operator Set Pump Type |
| 41 | 120 PSI* | −10 PSI | 1582 RPM* | X | 2445 GPM* | Draft |
| 38 | 150 PSI | 10 PSI | 1740 RPM* | X | 5000 GPM* | Relay |
| 36 | 90 PSI | 10 PSI | 1265 RPM* | X | 5000 GPM* | Relay |
| 34 | 125 PSI | 10 PSI* | 1582 RPM* | X | 2750 GPM* | Relay |
| 32 | 90 PSI* | 10 PSI* | 1265 RPM* | X | 2750 GPM* | Relay |
| 30 | 130 PSI* | −11 PSI* | 1740 RPM* | X | 2750 GPM* | Draft |
| 43 | 120 PSI* | −10 PSI | 1600 RPM* | X | 2555 GPM* | Draft |

Note:
1.) An asterisk indicates an automatically adjusted variable
2.) Pump 41 and 43 are set up in parallel A further example show a situation where an operator sets a delivery rate for a specific tank or series of holding tanks 62.

Example 4

The desired delivery rate is adjusted from 7500 GPM with a pressure of 10 PSI to 6400 gallons per minute with a pressure of 10 psi.
The table below shows the systems performance settings prior to the operator making the system adjustment.

| | | | Initial Operating Condition (7500 GPM @ 10 PSI) | | | |
|---|---|---|---|---|---|---|
| PUMP Reference (FIG. 4) | Operating Discharge Pressure | Resulting Inlet Pressure | Resulting Engine Speed | Initial Pressure Set By Operator | Flow at pump asset | Operator Set Pump Type |
| 41 | 120 PSI | −10 PSI | 1582 RPM | X | 2445 GPM | Draft |
| 38 | 150 PSI | 10 PSI | 1740 RPM | X | 5000 GPM | Relay |
| 36 | 90 PSI | 10 PSI | 1265 RPM | X | 5000 GPM | Relay |
| 34 | 125 PSI | 10 PSI | 1582 RPM | X | 2750 GPM | Relay |
| 32 | 90 PSI | 10 PSI | 1265 RPM | X | 2750 GPM | Relay |
| 30 | 130 PSI | −11 PSI | 1740 RPM | X | 2750 GPM | Draft |
| 43 | 120 PSI | −10 PSI | 1600 RPM | X | 2555 GPM | Draft |

Note:
1.) An asterisk indicates an automatically adjusted variable
2.) Pump 41 and 43 are set up in parallel The following Table contains the automated system adjustments following the operators change to the system delivery rate.

| | | | Adjustments to Accommodate the System Setting of 6400 GPM @ 10 PSI | | | |
|---|---|---|---|---|---|---|
| PUMP Reference (FIG. 4) | Operator Set Discharge Pressure | Resulting Inlet Pressure | Resulting Engine Speed | Initial Pressure Set By Operator | Flow at pump asset | Operator Set Pump Type |
| 41 | 150 PSI* | −12 PSI* | 1850 RPM* | X | 3200 GPM* | Draft |
| 38 | 150 PSI* | 40 PSI | 1503 RPM* | X | 6200 GPM* | Relay |
| 36 | 90 PSI | 10 PSI | 1265 RPM | X | 6200 GPM* | Relay |
| 34 | | | | | | |
| 32 | | | | | | |

Adjustments to Accommodate the System Setting of 6400 GPM @ 10 PSI

| PUMP Reference (FIG. 4) | Operator Set Discharge Pressure | Resulting Inlet Pressure | Resulting Engine Speed | Initial Pressure Set By Operator | Flow at pump asset | Operator Set Pump Type |
|---|---|---|---|---|---|---|
| 30 | | | | | | |
| 43 | 150 PSI * | −12 PSI* | 1850 RPM* | X | 3200 GPM* | Draft |

Note:
1.) An asterisk indicates an automatically adjusted variable
2.) Pump 41 and 43 are set up in parallel
3.) Pumps 34, 32, and 30 have been shut down In a further aspect of the invention the holding tank 62 or multiple tanks include liquid level sensors. In one aspect a tank 62 includes a first fluid level sensor located at or near the top portion of the tank and a second fluid level sensor located at a lower portion inside the tank. In one aspect the second fluid level sensor may be located at the quarter full level or at some other desired lower level. An electrically actuated valve is included which will open or close to allow for fluid to flow into the tank from tank input conduit, for instance. A communication module is also provided. When fluid in the tank reaches the first fluid level sensor a signal is sent to the communication module to indicate a tank full state. The communication module sends a signal to the pump facility 30 (or other pump facilities) to shut down the pump or the line of pumps. When the fluid in the tank is evacuated to a point where the lower or second fluid level sensor is out of fluid, a signal is sent from the sensor (or the signal is stopped) to the communication module to indicate an automatic request for filling. The communication module sends a signal to the control 50 of a facility 30 (or to several facilities) to operate for pumping. The signal may trigger operation at a previously set delivery rate and pressure, and the tank will automatically refill until the fluid level is achieved. The desired fluid level may correspond to the top level or some other level configured by the user or programmed into the controller or system.

There are a number of additional features provided with a system or facility of the invention, including, for instance, an armed start status where the pump starts automatically when fluid reaches the suction inlet, diagnostic alarms are transmitted upon pump transmission overheat, engine overheat, low pump oil level, low fuel level warning and automatic shut down before fuel tank is empty, automatic operator notification for scheduled maintenance events, pump heater core to reduce risk of pump freeze or overheat, automatic prime and re-prime of a draft pump for hands-free operation, a long range communication antenna configured for cell phone and/or other communications, and data storage with corresponding data ports.

It should be understood, of course, that the foregoing relates to exemplary aspects of the invention and that modifications may be made without departing from the spirit and scope of the invention as set forth in the following claims. The terms and descriptions used herein are set forth by way of illustration only and are not meant as limitations.

What is claimed is:

1. A pumping facilities system comprising:
   a first portable pump facility comprising:
      a first centrifugal pump having a first intake conduit and a first discharge conduit; and
      a first engine configured to power the first centrifugal pump;
   a second portable pump facility connected in series to the first portable pump facility via a connecting conduit, the second portable pump facility comprising:
      a second centrifugal pump having a second intake conduit connected in series to the first discharge conduit via the connecting conduit, the second intake conduit having an input pressure sensor, and a second output conduit; and
      a second engine configured to power the second pump;
   a third portable pump facility having a third intake conduit connected in series to the second output conduit of the second portable pump facility via a second connecting conduit; and
   a controller having a processor operatively connected to the second portable pump facility to automatically adjust a speed of the second engine upon detection of an inefficient activity event of the second pump, the controller including a pre-set discharge pressure setting, the controller configured to automatically reduce an engine speed of the second engine while maintaining the pre-set discharge pressure setting when there is an increase in pressure detected at the second intake conduit, the controller configured to automatically substantially equalize a fluid pressure measured within the connecting conduit between the first portable pump facility and the second portable pump facility with a fluid pressure measured within the second connecting conduit between the second portable pump facility and the third portable pump facility.

2. The system of claim 1 where the second portable pump facility includes the controller, the controller configured to receive user input of a pre-set discharge pressure for the second portable pump facility.

3. The system of claim 1 where the controller is configured to automatically reduce a speed of an impeller within the second portable pump facility when a cavitation event is detected within the second portable pump facility.

4. The system of claim 1 where the first portable pump facility includes a communication device configured to send and receive a communication signal.

5. The system of claim 4 where the communication device is configured to send and receive a wireless signal, the first portable pump facility further comprising a primer system having a primer motor configured to prime the first pump for operation, the primer system having an air eliminator valve, the eliminator valve configured to allow air from within the first pump to escape while the primer motor draws liquid into a cavity of the first the controller configured to automatically activate the primer system in response to a low fluid or no fluid state in the first pump.

6. The system of claim 1 where the inefficient activity event is a cavitation event defined by at least one pressure level condition suggestive of pump cavitation or potential pump cavitation.

7. The system of claim 1 where detection of the inefficient activity event includes comparison of a change in pressure at the intake conduit of the second pump facility.

8. The system of claim 1 where the first portable pump facility is positioned at a first elevation and the second portable pump facility is positioned at a second elevation, the first elevation being different compared to the second elevation.

9. The system of claim 1 where the first portable pump facility includes a fuel tank positioned on a trailer and configured to supply fuel to the first engine.

10. The system of claim 1 where the controller subsequently automatically increases the speed of the second engine after a predetermined interval.

11. The system of claim 1 where the controller is configured such that automatic increase of the speed of the second engine increases until or unless a further inefficient pump activity event occurs at the second pump.

12. The system of claim 1 where the controller is configured to determine an inefficient pump activity event of the second pump by monitoring engine speed of the second engine and by monitoring discharge pressure at the second discharge conduit.

13. The system of claim 1 where the controller is configured to receive pressure data from a sensor located at the second discharge conduit and speed data from a sensor in association with the second engine, the controller configured to determine an inefficient pump activity occurrence of the second pump where the engine speed change over a 1 second interval is greater than 60 RPM and while a discharge pressure increase at the second discharge conduit is less than 2 PSI.

14. The system of claim 1 where the controller is further configured to repeat the automatic reducing of the speed of the second engine upon continuing occurrence of the inefficient pump activity event and to repeat an automatic increase of the speed of the second engine until the second pump achieves a non-inefficient pump activity at a new set-point, the new set-point being a discharge pressure less than a set-point discharge pressure, the set-point discharge pressure being a discharge pressure value of the second pump representing a desired output pressure of the second pump and designated in the controller.

15. The system of claim 1 where the second discharge conduit includes an output pressure sensor, the controller receives signals from the output pressure sensor and a speed sensor associated with the second engine, the controller automatically lowers the speed of the second engine upon an inefficient pump activity event for a set period of time and automatically increases the speed of the second engine after the set period of time has lapsed.

16. The system of claim 1 where the controller is configured to automatically increase the speed of the second engine, the automatic increase of the speed of the second engine increases until a drop-point pressure is achieved at the second discharge conduit, the drop-point pressure represents a pressure value less than a set-point discharge pressure of the second pump, the set-point discharge pressure being a discharge pressure value of the second pump representing a desired output pressure value of the second pump and designated in the controller, the controller configured such that the engine speed continues to increase until a ramp-up level is reached, the ramp-up level representing a pressure at the second discharge conduit less than the set-point discharge pressure.

17. The system of claim 1 further comprising a discharge pressure sensor configured to sense instantaneous fluid pressure downstream from a pumping chamber of the second pump and configured to generate an electrical signal corresponding to the sensed discharge pressure;
a speed sensor in association with the second engine and configured to generate an electrical signal corresponding to speed of an impeller associated with the second pump; and
the controller responsive to the discharge pressure sensor and the speed sensor and configured to generate an error signal in response to variations among a plurality of instantaneous pressure signals, and further configured to automatically lower a speed of the second engine upon occurrence of an inefficient pump activity event and to subsequently automatically increase the speed of the second engine and to repeat the automatic increase of the speed of the second engine until the pump achieves a non-inefficient pump activity event at a new set-point, the new set-point being a discharge pressure less than a set-point discharge pressure, the set-point discharge pressure being a discharge pressure value of the second pump representing desired output pressure of the second pump and designated in the controller.

18. A pumping facilities system comprising:
a first portable pump facility comprising:
a first centrifugal pump having a first intake conduit and a first discharge conduit; and
a first engine configured to power the first centrifugal pump;
at least a second portable pump facility connected in series to the first portable pump facility via a connecting conduit, the second portable pump facility comprising:
a second centrifugal pump having a second intake conduit and a second discharge conduit, the second intake conduit connected in series to the first discharge conduit via the connecting conduit and having an input pressure sensor; and
a second engine configured to power the second pump; and
a controller having a processor operatively connected to the second portable pump facility to automatically adjust a speed of the second engine upon detection of an inefficient activity event of the second pump where each portable pump facility includes a GPS locator and is represented graphically in a website display associated with the system, the GPS locator configured to send a signal to the controller, the controller configured to utilize the GPS signal for activation of a facility re-set feature;
wherein the facility reset feature comprises resetting controller parameters including predefined pressure set points, priming states, flow volumes, time intervals, or engine speeds desired for a specific pumping application, the facility re-set feature is automatically activated upon a GPS change of location of the second portable pump facility.

19. The pumping facilities system of claim 18 where the website display is associated with a website configured to allow a user to control at least one of the portable pump facilities.

20. The pumping facilities system of claim 18 where the facility re-set feature includes a pump setup screen prompting a user to reset the second pump facility with a desired setting for operation of the second pump facility when the second pump facility has moved to a new location.

21. A pumping facilities system comprising:
- a first portable pump facility comprising:
  - a first centrifugal pump having a first intake conduit and a first discharge conduit; and a first engine configured to power the first centrifugal pump;
- a second portable pump facility connected in series to the first portable pump facility via a connecting conduit, the second portable pump facility comprising:
  - a second centrifugal pump having a second intake conduit connected in series to the first discharge conduit via the connecting conduit, the second intake conduit having an input pressure sensor, and a second output conduit;
  - and a second engine configured to power the second pump;
- a third portable pump facility having a third intake conduit connected in series to the second output conduit of the second portable pump facility via a second connecting conduit; and
- a controller having a processor operatively connected to the second portable pump facility to automatically adjust a speed of the second engine upon detection of a possible cavitation event of the second pump, the controller including a pre-set discharge pressure setting, the controller configured to automatically reduce an engine speed of the second engine while maintaining the pre-set discharge pressure setting when there is an increase in pressure detected at the second intake conduit, the controller configured to automatically substantially equalize a fluid pressure measured within the connecting conduit between the first portable pump facility and the second portable pump facility with a fluid pressure measured within the second connecting conduit between the second portable pump facility and the third portable pump facility, at least one of the pump facilities including a GPS locator configured to receive a signal for the controller, the controller configured to utilize the GPS signal for activation of a facility re-set feature upon the at least one of the pump facilities changing location;
- wherein the facility reset feature comprises resetting controller parameters including predefined pressure set points, priming states, flow volumes, time intervals, or engine speeds desired for a specific pumping application.

* * * * *